(12) United States Patent
Mate et al.

(10) Patent No.: US 10,291,845 B2
(45) Date of Patent: May 14, 2019

(54) METHOD, APPARATUS, AND COMPUTER PROGRAM PRODUCT FOR PERSONALIZED DEPTH OF FIELD OMNIDIRECTIONAL VIDEO

(71) Applicant: Nokia Technologies OY, Espoo (FI)

(72) Inventors: Sujeet Mate, Tampere (FI); Kimmo Tapio Roimela, Tampere (FI)

(73) Assignee: NOKIA TECHNOLOGIES OY, Espoo (FI)

(*) Notice: Subject to any disclaimer, the term of this patent is extended or adjusted under 35 U.S.C. 154(b) by 490 days.

(21) Appl. No.: 14/827,736

(22) Filed: Aug. 17, 2015

(65) Prior Publication Data
US 2017/0054903 A1    Feb. 23, 2017

(51) Int. Cl.
*G01B 11/14*    (2006.01)
*G06T 19/00*    (2011.01)
(Continued)

(52) U.S. Cl.
CPC ......... *H04N 5/23238* (2013.01); *G01B 11/14* (2013.01); *G06K 9/4671* (2013.01);
(Continued)

(58) Field of Classification Search
CPC .............................. H04N 5/23238; G06T 7/73
See application file for complete search history.

(56) References Cited

U.S. PATENT DOCUMENTS 5,850,352 A * 12/1998 Moezzi ................ H04N 13/139
345/419
6,043,837 A    3/2000 Driscoll, Jr. et al.
(Continued)

FOREIGN PATENT DOCUMENTS

CN    101835023 A    9/2010
EP    2 490 179 A    8/2012
(Continued)

OTHER PUBLICATIONS

*GPU Gems—Chapter 23. Depth of Field: A Survey of Techniques* [online] [retrieved Oct. 5, 2015]. Retrieved from the Internet: <URL: http://http.developer.nvidia.com/GPUGems/gpugems_ch23.html>. 17 pages.
(Continued)

*Primary Examiner* — Jayanti K Patel
*Assistant Examiner* — Irfan Habib
(74) *Attorney, Agent, or Firm* — Alston & Bird LLP

(57) ABSTRACT

A method, apparatus, and computer program product are provided for providing personalized depth of field perception for omnidirectional video. A method is provided that includes generating, by a processor, a three-dimensional reconstruction of content from an omnidirectional capture device; determining a camera pose of an end user device in relation to the omnidirectional capture device content; identifying an object of interest in the content based in part on the camera pose of the end user device; generating an artificial depth of field for the content wherein the object of interest is in focus; and causing a personalized content view to be provided based on the object of interest and the artificial depth of field. A corresponding apparatus and a computer program product are also provided.

20 Claims, 4 Drawing Sheets

(51) Int. Cl.

| | |
|---|---|
| *H04N 5/232* | (2006.01) |
| *H04N 13/332* | (2018.01) |
| *G06T 5/00* | (2006.01) |
| *G06T 19/20* | (2011.01) |
| *H04N 5/341* | (2011.01) |
| *G06K 9/46* | (2006.01) |

(52) U.S. Cl.
CPC ............ *G06T 5/002* (2013.01); *G06T 19/006* (2013.01); *G06T 19/20* (2013.01); *H04N 5/23212* (2013.01); *H04N 5/3415* (2013.01); *H04N 13/332* (2018.05); *G06T 2207/10016* (2013.01); *G06T 2207/30221* (2013.01); *G06T 2207/30244* (2013.01)

(56) References Cited

U.S. PATENT DOCUMENTS

| | | | |
|---|---|---|---|
| 6,741,250 | B1 | 5/2004 | Furlan et al. |
| 7,388,598 | B2 * | 6/2008 | Lee .................. H04N 5/232 |
| | | | 348/42 |
| 8,451,346 | B2 * | 5/2013 | Free .................. H04N 5/23238 |
| | | | 345/427 |
| 9,042,638 | B2 * | 5/2015 | Zhou .................. G06K 9/00536 |
| | | | 382/154 |
| 10,003,743 | B2 * | 6/2018 | S V .................... H04N 5/23258 |
| 10,049,492 | B2 * | 8/2018 | Babahajiani ............ G06T 17/20 |
| 2002/0105598 | A1 | 8/2002 | Tai et al. |
| 2002/0196327 | A1 | 12/2002 | Rui et al. |
| 2005/0018058 | A1 * | 1/2005 | Aliaga .................. G06K 9/209 |
| | | | 348/239 |
| 2010/0017047 | A1 | 1/2010 | Sanders-Reed |
| 2010/0040279 | A1 * | 2/2010 | Yoon .................. G05D 1/0251 |
| | | | 382/153 |
| 2010/0331047 | A1 | 12/2010 | Bilcu et al. |
| 2012/0057852 | A1 | 3/2012 | Devleeschouwer et al. |
| 2012/0242801 | A1 * | 9/2012 | Barnes ............... A61N 1/36046 |
| | | | 348/46 |
| 2013/0083237 | A1 * | 4/2013 | Satou .................. H04N 5/2351 |
| | | | 348/362 |
| 2014/0300637 | A1 | 10/2014 | Fan et al. |
| 2015/0215532 | A1 | 7/2015 | Jafarzadeh et al. |
| 2016/0353026 | A1 * | 12/2016 | Blonde ................. G06T 7/0002 |
| 2017/0045950 | A1 * | 2/2017 | El Dokor ................ G06F 3/017 |
| 2017/0091906 | A1 * | 3/2017 | Liang ..................... G06T 5/002 |
| 2017/0273552 | A1 * | 9/2017 | Leung ..................... A61B 3/02 |
| 2018/0007422 | A1 * | 1/2018 | Castleman .......... H04L 65/4069 |

FOREIGN PATENT DOCUMENTS

| | | |
|---|---|---|
| JP | 2006-339903 | 12/2006 |
| JP | 2009-015828 A | 1/2009 |
| JP | 2010-152521 A | 7/2010 |
| JP | 2010-256296 A | 11/2010 |
| JP | 2011-108028 A | 6/2011 |
| JP | 2012-058952 | 3/2012 |
| JP | 2014-014071 | 1/2014 |
| JP | 2015-142366 | 8/2015 |
| WO | WO-2009097449 A1 | 8/2009 |
| WO | WO-2014079879 A2 | 5/2014 |

OTHER PUBLICATIONS

Diverdi, S. et al.; "Envisor: Online Environment Map Construction for Mixed Reality"; Virtual Reality Conference 2008; IEEE; Piscataway, NJ, USA; Mar. 8, 2008; pp. 19-26; XP031339993.

Gaemperle, Luis et al.; "An Immersive Telepresence System Using a Real-Time Omnidirectional Camera and a Virtual Reality Head-Mounted Display"; 2014 IEEE International Symposium on Multimedia; Dec. 1, 2014; pp. 175-178; XP055282584.

Office Action for Chinese Patent Application No. 201610674650.3, dated Nov. 6, 2017, 10 pages.

Office Action for Japanese Patent Application No. 2016-157298 dated Dec. 1, 2017, 5 pages.

Office Action for Japanese Patent Application No. 2016-157298 dated Oct. 12, 2018.

Extended European Search Report for European Patent Application No. 16184413.9 dated Jan. 18, 2017, 9 pages.

* cited by examiner

Objects in light blue have been blurred by artificial DOF

Darker objects are in focus

METHOD, APPARATUS, AND COMPUTER PROGRAM PRODUCT FOR PERSONALIZED DEPTH OF FIELD OMNIDIRECTIONAL VIDEO

TECHNOLOGICAL FIELD

An example embodiment of the present invention relates generally to immersive content capture devices and the recording of omnidirectional video.

BACKGROUND

Immersive content capture devices, such as an Omnidirectional Content Capture (OCC) device, allow recording of omnidirectional, 360° video. Placing an omnidirectional camera at, for example, a sports event lets remote viewers access the omnidirectional video feed, or parts of the omnidirectional video feed. The content from the omnidirectional video feed can be viewed on virtual reality (VR) goggles, for example, or a part of it can be framed for a regular screen and viewed as normal video.

While the omnidirectional video feed from an event can be enjoyed on a remote screen, the content may look bland due to the large depth of field of the video. In some cases, the viewer may wish to emphasize or focus on a particular person or object of interest in the content. For example, in a football game, the viewer may wish to follow a certain player. A regular camera can focus on the viewing target, with objects closer to and further away from the viewing target being out of focus, but this is not possible with content where the focus of attention is not known at shooting time.

Embodiments of the present invention provide for user control to personalize a hyper focal captured omnidirectional video and depth of field/camera characteristic aspects.

BRIEF SUMMARY

Methods, apparatuses, and computer program products are therefore provided according to example embodiments of the present invention to provide personalized depth of field perception for omnidirectional video.

In one embodiment, a method is provided that at least includes generating, by a processor, a three-dimensional reconstruction of content from an omnidirectional capture device; determining a camera pose of an end user device in relation to the omnidirectional capture device content; identifying an object of interest in the content based in part on the camera pose of the end user device; generating an artificial depth of field for the content wherein the object of interest is in focus; and causing a personalized content view to be provided based on the object of interest and the artificial depth of field.

In some embodiments, the method further comprises determining framing around the object of interest to ensure the application of the artificial depth of field to one or more objects in the content is semantically coherent.

In some embodiments, the method further comprises receiving sensor data or visual data from the end user device for use in determining the camera pose.

In some embodiments, the method further comprises using depth information from the three-dimensional reconstruction in generating the artificial depth of field.

In some embodiments, generating the artificial depth of field comprises maintaining the focus of the object of interest and blurring other objects that are at a distance from the object of interest.

In some embodiments, the method further comprises mapping reconstructed three-dimensional elements from the omnidirectional content to a camera view of the end user device based on the camera pose.

In some embodiments, identifying an object of interest comprises selecting a most central object in the camera view of the end user device or receiving an indication from a user of the end user device.

In some embodiments, the sensor data is one or more of magnetometer data, accelerometer data, or GPS data.

In some embodiments, the method further comprises receiving end user device content capture characteristics for use in generating the personalized content view, wherein the content capture characteristics include one or more of hue settings, brightness settings, and exposure settings.

In another embodiment, an apparatus is provided comprising at least one processor and at least one memory including computer program instructions, the at least one memory and the computer program instructions, with the at least one processor, causing the apparatus at least to: generate a three-dimensional reconstruction of content from an omnidirectional capture device; determine a camera pose of an end user device in relation to the omnidirectional capture device content; identify an object of interest in the content based in part on the camera pose of the end user device; generate an artificial depth of field for the content wherein the object of interest is in focus; and cause a personalized content view to be provided based on the object of interest and the artificial depth of field.

In some embodiments, the apparatus further comprises the at least one memory and the computer program instructions, with the at least one processor, causing the apparatus at least to determine framing around the object of interest to ensure the application of the artificial depth of field to one or more objects in the content is semantically coherent.

In some embodiments, the apparatus further comprises the at least one memory and the computer program instructions, with the at least one processor, causing the apparatus at least to receive sensor data or visual data from the end user device for use in determining the camera pose.

In some embodiments, the apparatus further comprises the at least one memory and the computer program instructions, with the at least one processor, causing the apparatus at least to use depth information from the three-dimensional reconstruction in generating the artificial depth of field.

In some embodiments, generating the artificial depth of field comprises maintaining the focus of the object of interest and blurring other objects that are at a distance from the object of interest.

In some embodiments, the apparatus further comprises the at least one memory and the computer program instructions, with the at least one processor, causing the apparatus at least to map reconstructed three-dimensional elements from the omnidirectional content to a camera view of the end user device based on the camera pose.

In some embodiments, identifying an object of interest comprises selecting a most central object in the camera view of the end user device or receiving an indication from a user of the end user device.

In some embodiments, the sensor data is one or more of magnetometer data, accelerometer data, or GPS data.

In some embodiments, the apparatus further comprises the at least one memory and the computer program instructions, with the at least one processor, causing the apparatus at least to receive end user device content capture characteristics for use in generating the personalized content view, wherein the content capture characteristics include one or more of hue settings, brightness settings, and exposure settings.

In another embodiment, a computer program product is provided comprising at least one non-transitory computer-readable storage medium bearing computer program instructions embodied therein for use with a computer, the computer program instructions comprising program instructions, when executed, causing the computer at least to: generate a three-dimensional reconstruction of content from an omnidirectional capture device; determine a camera pose of an end user device in relation to the omnidirectional capture device content; identify an object of interest in the content based in part on the camera pose of the end user device; generate an artificial depth of field for the content wherein the object of interest is in focus; and cause a personalized content view to be provided based on the object of interest and the artificial depth of field.

In some embodiments, the computer program product further comprises program instructions, when executed, causing the computer at least to determine framing around the object of interest to ensure the application of the artificial depth of field to one or more objects in the content is semantically coherent.

In some embodiments, the computer program product further comprises program instructions, when executed, causing the computer at least to receive sensor data or visual data from the end user device for use in determining the camera pose.

In some embodiments, the computer program product further comprises program instructions, when executed, causing the computer at least to use depth information from the three-dimensional reconstruction in generating the artificial depth of field.

In some embodiments, generating the artificial depth of field comprises maintaining the focus of the object of interest and blurring other objects that are at a distance from the object of interest.

In some embodiments, the computer program product further comprises program instructions, when executed, causing the computer at least to map reconstructed three-dimensional elements from the omnidirectional content to a camera view of the end user device based on the camera pose.

In some embodiments, identifying an object of interest comprises selecting a most central object in the camera view of the end user device or receiving an indication from a user of the end user device.

In some embodiments, the sensor data is one or more of magnetometer data, accelerometer data, or GPS data.

In some embodiments, the computer program product further comprises program instructions, when executed, causing the computer at least to receive end user device content capture characteristics for use in generating the personalized content view, wherein the content capture characteristics include one or more of hue settings, brightness settings, and exposure settings.

BRIEF DESCRIPTION OF THE DRAWINGS

Figure 1:
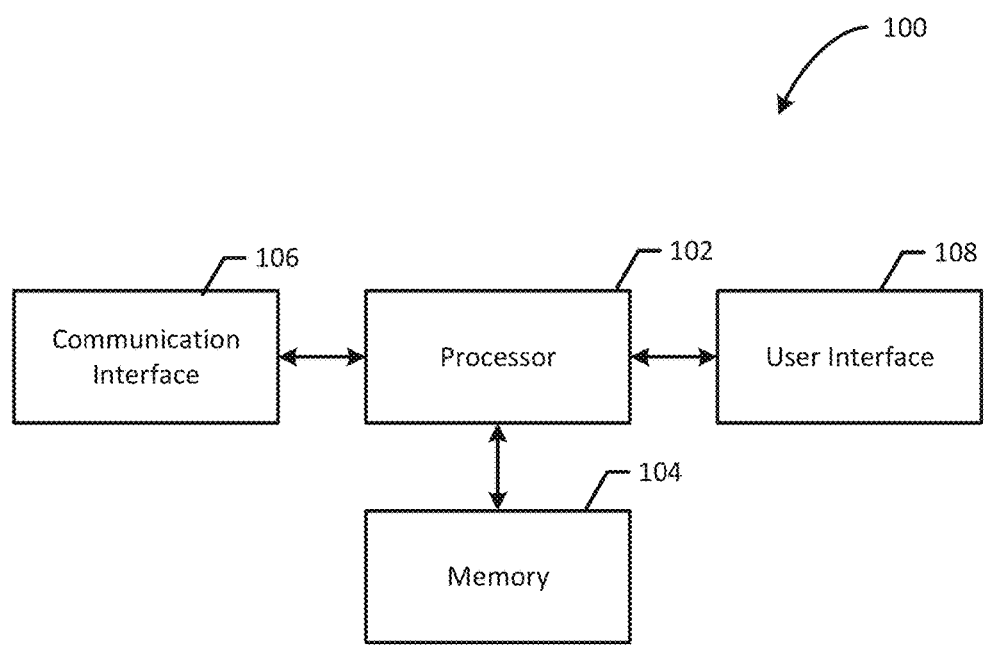
Figure 2A:
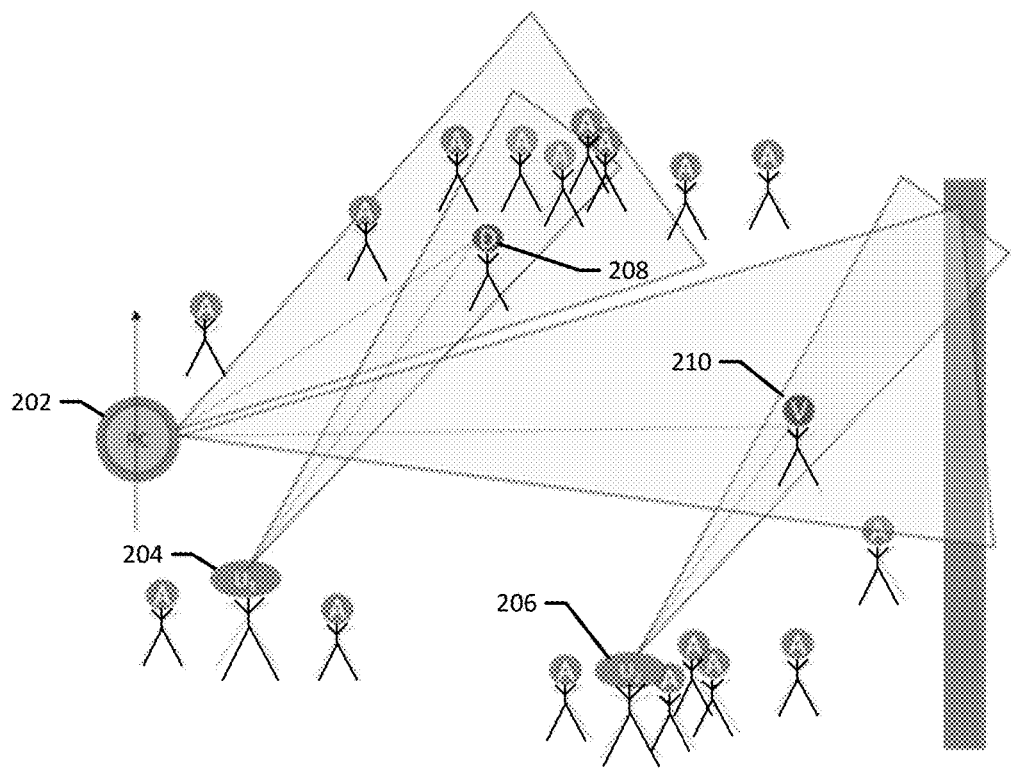
Figure 2B:
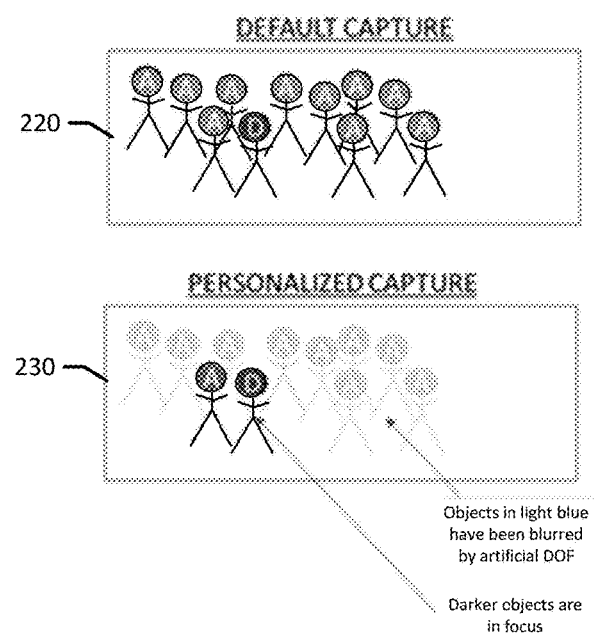
Figure 3:
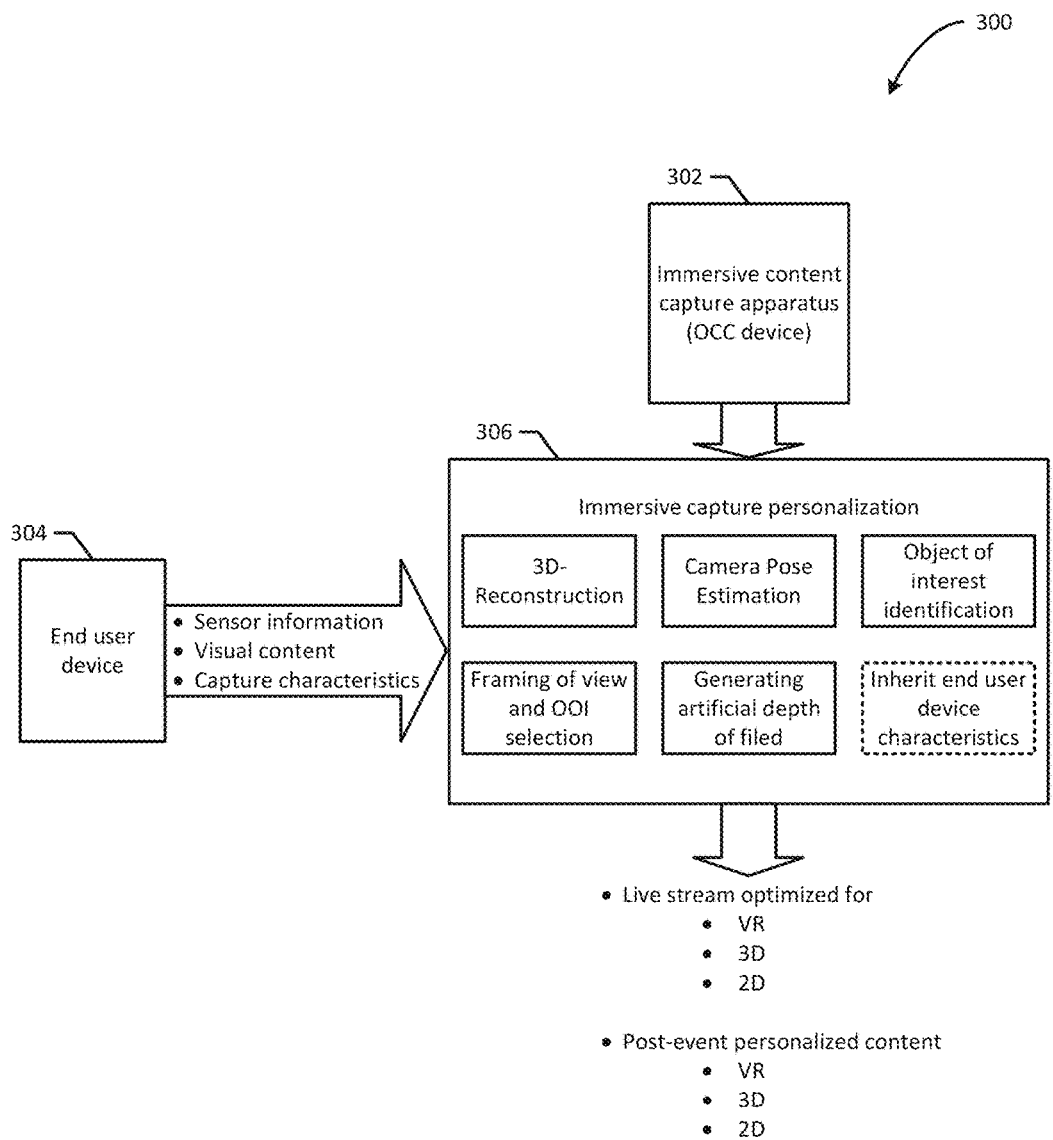
Figure 4:
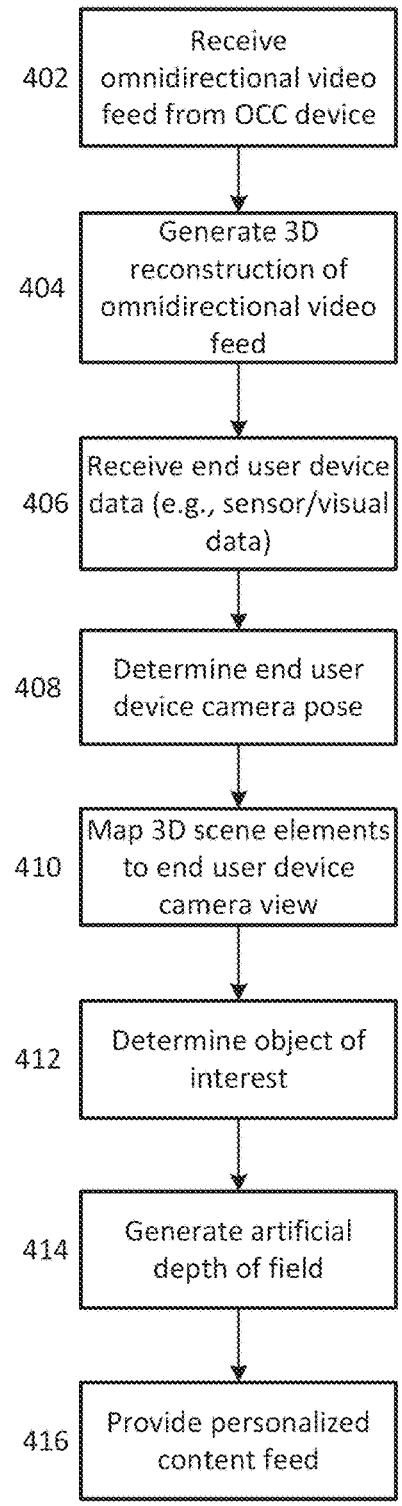

Having thus described certain embodiments of the invention in general terms, reference will now be made to the accompanying drawings, which are not necessarily drawn to scale, and wherein:

FIG. 1 illustrates a block diagram of an apparatus that may be specifically configured in accordance with an example embodiment of the present invention;

FIG. 2A illustrates an example of capturing personalized feeds in accordance with an example embodiment of the present invention;

FIG. 2B illustrates an example of capturing personalized feeds in accordance with an example embodiment of the present invention;

FIG. 3 illustrates a simplified view of the components of an example system in accordance with an example embodiment of the present invention; and FIG. 4 provides a flow chart illustrating operations for generating a personalized feed from omnidirectional video content performed by an apparatus in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Methods, apparatuses, and computer program products are provided in accordance with example embodiments of the present invention to provide personalized depth of field perception for omnidirectional video.

Omnidirectional video content enables the viewer to freely change their viewing direction and choose the part of the scene they focus their attention on at any given time. As such, the content is typically hyper focal in nature, so that more or less everything is in focus. The multiple lenses used in a typical 360° camera have slightly differing viewpoints, enabling multi-view stereo reconstruction to build a three dimensional (3D) model of the scene being recorded. Sensor-based and visual tracking of mobile devices can be applied to determine the camera pose of a mobile device with respect to a known, three-dimensional visual reference.

Embodiments of the present invention provide for achieving a user driven personalization of an otherwise uniform content (i.e. uniform for all the viewers). Embodiments allow for generating a "unique" view that follows a user's view and/or directions. Embodiments generate a "customized" depth of field (DOF) perception and capture device characteristics to give an impression of personalized capture from an otherwise hyper focal capture and uniform content for all the users.

Embodiments of the present invention enable a viewer at an event to use their mobile device to access the stream of an omnidirectional capture device (e.g., Omnidirectional Content Capture (OCC) device) and generate a personalized capture with artificial depth of field applied so that only the object of interest to the viewer is in focus. In embodiments of the present invention, this is achieved by:

1. Making a real-time 3D reconstruction of the scene using the multi-view imagery from the OCC device.
2. Determining the camera pose of the mobile device with respect to the omnidirectional content.
3. Identifying the object of interest of the end user of the mobile device.
4. Using the 3D depth information to generate artificial depth of field for the omnidirectional content, with the mobile device user's object of interest in focus and with closer and more distant scene elements blurred.

The earlier hyper focal content is now transformed to match the mobile device end user's personalized viewing experience, with user influenced depth of field. This content can be streamed to users who are either watching the content live or later with their VR devices or even on conventional displays.

Thus, embodiments of the present invention can provide a second camera angle in addition to the immersive content capture device (any type of OCC device) for the event and assist in generation of a personalized version of the "vanilla" hyper focal content capture done by the immersive content capture device.

In some embodiments of the invention, in addition to the artificial depth of field customization determined based on the end user device provided camera angle, embodiments include determination of the framing around the identified object of interest (OOI) in the view. This includes, but is not limited to, ensuring that the depth of field is applied to a semantically coherent one or more objects in the scene. For example, the artificial depth of field should include the full person at a similar depth and not "enhance" the depth perception only for a part of the face.

In some embodiments of the invention, the end user's mobile device camera characteristics are inherited while generating the artificial depth of field enhanced personalized content version. These content capture characteristics can be camera settings related to hue, exposure, etc. settings.

In some embodiments of the invention, the end user mobile device sends sensor data and/or visual data, as a post-processing step. Consequently, the steps described above are done after the event, with higher acceptable processing delays. All this results in generating multiple versions of end user customized content.

Embodiments of the invention may thus enable ordinary users to automatically post-process an omnidirectional video feed from a high-end professional capture device, creating personalized feeds that emphasize their objects of interest in the video content. In the various embodiments, this personalized omnidirectional content feed can be available either during the event (e.g., for live streaming) or after the event (e.g., with post-event processing), which can be consumed by multiple users with a higher amount of variety and personalization.

FIG. 1 illustrates an example of an apparatus 100 that may be used in embodiments of the present invention and that may perform one or more of the operations set forth by FIG. 4 described below. In this regard, the apparatus may be embodied by the mobile device 104, end user device 110, or content server 106 of FIG. 1.

It should also be noted that while FIG. 1 illustrates one example of a configuration of an apparatus 100, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring to FIG. 1, the apparatus 100 in accordance with one example embodiment may include or otherwise be in communication with one or more of a processor 102, a memory 102, a communication interface circuitry 106, and user interface circuitry 106.

In some embodiments, the processor (and/or co-processors or any other processing circuitry assisting or otherwise associated with the processor) may be in communication with the memory device via a bus for passing information among components of the apparatus. The memory device may include, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor 102. Additionally or alternatively, the memory device could be configured to store instructions for execution by the processor.

In some embodiments, the apparatus 100 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 102 may be configured to execute instructions stored in the memory device 104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 106 may be any means such as a device or circuitry embodied in either hardware or a combination of hardware and software that is configured to receive and/or transmit data from/to a network and/or any other device or module in communication with the apparatus 100. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The apparatus 100 may include user interface 108 that may, in turn, be in communication with the processor 102 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

FIG. 2A illustrates an example of capturing personalized feeds in accordance with an example embodiment of the present invention. As illustrated in FIG. 2, two users ("User U1" 204 and "User U2" 206) are creating personalized feeds of the scene being captured by the omnidirectional camera ("OCC" 202), located on the left. User U1 is pointing her mobile device at person D (208), which becomes the object in focus of her personalized feed. User U2 is targeting person V (210), who is the target for another personalized feed using her mobile device. Each user receives her own feed, centered on and framed around the selected person of interest, with artificial depth of field being applied to emphasize the targets D and V, respectively.

FIG. 2B illustrates an example of capturing personalized feeds in accordance with an example embodiment of the present invention. Default capture 220 illustrates omnidirectional hyper focal content, where the objects (e.g., people A and D) are in focus. Personalized capture 230 illustrates a personalized feed generated for a user who has targeted person D. In personalized capture 230, person D (and possibly objects in close proximity to person D) becomes the object of focus in the personalized feed (illustrated as darker objects in personalized capture 230). Other objects/people in the omnidirectional capture are blurred using artificial DOF (illustrated as lighter objects in personalized capture 230).

FIG. 3 illustrates a simplified view of some components included in an example system in accordance with an example embodiment of the present invention. FIG. 3 illustrates three essential components, including the immersive content capture apparatus 302 (e.g., a camera array or type of OCC device), an end user device 304 (e.g., a mobile device), and an immersive capture personalization processing element 306 which combines the information from the end user device and the OCC device. In some embodiments, the immersive capture personalization processing element may be comprised in the end user device. In other embodiments, the immersive capture personalization processing element may be comprised in a separate computing device. In other embodiments, the immersive personalization processing may be distributed between an end user device and a separate computing device. For example, in some embodiments, computationally expensive 3D reconstruction and camera pose estimation may occur in a separate computing device and the final view framing and other post-processing may occur in the end user device.

The immersive capture personalization processing element 306 may provide for various functions as part of an omnidirectional video personalization system. For example, the immersive capture personalization processing element 306 may provide for 3D reconstruction, determination of camera pose of the end user device, identifying an object of interest, generating artificial depth of field, and/or generating intelligent framing. In some embodiments, the immersive capture personalization processing element 306 may also provide for inheriting end user device characteristics.

Real-Time 3D Reconstruction

In example embodiments, existing 3D structure-from-motion and/or stereo reconstruction techniques can be applied to the multi-view omnidirectional video stream to generate depth information. Alternatively, a depth camera may be integrated into the OCC device, in some embodiments. This provides for a 3D model of the scene, enabling the 3D locations of scene elements (e.g., persons A, D, and V in FIG. 2) to be determined and mapped to different viewpoints.

In some embodiments, the 3D reconstruction may not be done in real-time. This provides for the embodiments which involve generating a personalized content from the omnidirectional content captured by the OCC type of device post-capture. For example, sensor data may be stored as metadata in video captured by the end user device, and the sensor data may then be used post-capture to compare the content with content captured by an omnidirectional camera for use in generating the personalized video feed. Such embodiments may provide for more relaxed computation requirements.

In some embodiments, where the end user provides sensor and/or visual content information at a later stage, the 3D reconstruction may also be done in a non-real-time fashion.

Determining Camera Pose of Mobile Device

In example embodiments, the end user (e.g., U1 and U2 in FIG. 2) points their mobile device at the scene captured by the OCC device. Sensors such as magnetometer, accelerometer and/or, depending on the size of the scene, GPS, may be used to determine the camera pose of the end user's device approximately. This may then be refined visually by comparing the 3D reconstruction with the camera image, for example, by using known augmented reality techniques for visual camera pose tracking.

Identifying the Object of Interest

In example embodiments, once the camera pose is determined, the reconstructed 3D scene elements from the OCC device can be mapped to the camera view of the end user's mobile device. The most central object can be selected as the object of interest, or the user may indicate the object of interest, such as via touching it on their mobile device screen, for example.

Generating Artificial Depth of Field and Intelligent Framing

In example embodiments, after identifying the object in focus (e.g., object of interest), its depth relative to the OCC device can be determined. A personalized feed from the OCC device may then be generated for the end user, framed to follow the object of interest. Artificial depth of field can be applied, for example, generating a pleasing image with more shallow depth of field.

In some embodiments, the application of artificial depth of field may be done in such a way that it maintains the semantic coherence of the object of interest. If information is available, the semantic coherence of the multiple objects in the scene is maintained. For example, if a person/object of interest is closer to another person/object than a predefined threshold, the other person/object is applied a similar depth of field modification. This process may also takes into account the cinematic rules wherever applicable to ensure the frame of depth of field modifications is in accordance with professional content capture general rules.

Inheriting End User Device Content Capture Characteristics

In some embodiments, generating the personalized feed may also consist of absorbing certain content capture characteristics of the end user device which was used (e.g., mobile device). This may allow for further personalization of content for the end user. For example, the content capture characteristics may include, but are not limited to, hue settings, brightness, and/or the like.

Once the personalized feed has been generated from the omnidirectional video content feed, the personalized feed can be provided during an event, for example, in live streaming, or provided after the event, for example, using post-processing. Embodiments thus allow for consuming of the omnidirectional content feed by multiple users with a higher amount of variety and personalization.

FIG. 4 provides a flow chart illustrating example operations for providing a personalized feed from an omnidirectional video content feed in accordance with an example embodiment of the present invention.

In this regard, an apparatus, such as apparatus 100, may include means, such as the processor 102, memory 104, communication interface 106, user interface 108, or the like, for receiving an omnidirectional video stream, as shown in block 402 of FIG. 4. For example, the omnidirectional video stream may be provided from an immersive capture or omnidirectional capture device (e.g., OCC device or array of camera devices, or the like). As shown in block 404, the apparatus 100 may include means, such as processor 102, memory 104, communication interface 106, user interface 108, or the like, for generating a 3D reconstruction of the omnidirectional video stream to generate depth information. In example embodiments, the 3D reconstruction is used in generating depth information for the video content. In some embodiments, the 3D reconstruction may be generated in real-time. Alternatively, in some embodiments, the 3D reconstruction is not done in real-time, but rather post-capture.

In an example embodiment, the 3D reconstruction is generated using the multi-view imagery from the capture device, and may be generated using structure—from motion and/or stereo reconstruction techniques. In some embodiments, a depth camera may be integrated with the OCC device for use in generating the depth information. In example embodiments, the 3D reconstruction provides a 3D model of the scene enabling 3D locations of scene elements to be determined and mapped to different viewpoints.

As shown in block 406, the apparatus 100 may also include means, such as the processor 102, memory 104, communication interface 106, user interface 108, or the like, for receiving data from the und user's device, e.g., mobile device. For example, a user may direct his mobile device toward an object or person in the omnidirectional content scene and sensor data and/or visual data may be provided for use in determining the camera pose of the end user device. In example embodiments, one or more sensors, such as a magnetometer, accelerometer, GPS, and/or the like, may provide data for use in determining the camera pose. At block 408, the apparatus 100 may also include means, such as the processor 102, memory 104, communication interface 106, user interface 108, or the like, for determining the camera pose of the end user device with respect to the omnidirectional video content.

As shown in block 410, the apparatus 100 may also include means, such as the processor 102, memory 104, communication interface 106, user interface 108, or the like, for mapping scene elements from the 3D reconstruction to the camera view of the end user device based on the determined camera pose. At block 412, the apparatus 100 may also include means, such as the processor 102, memory 104, communication interface 106, user interface 108, or the like, for determining the object of interest for the end user. For example, in some embodiments, the most central object in the camera view may be selected as the object of interest. In some embodiments, the end user may indicate the object of interest, for example, by selecting the object on an interface of the end user device, e.g., a touchscreen.

As shown in block 412, the apparatus 100 may also include means, such as the processor 102, memory 104, communication interface 106, user interface 108, or the like, for generating an artificial depth of field using depth information, e.g., from the 3D reconstruction. In example embodiments, after the object of interest in the camera view has been identified, its depth relative to the OCC device can be determined. An artificial depth of field may then be generated for the content where the object of interest is in focus and scene elements (e.g., objects, people, etc.) closer or more distant may be blurred.

In some embodiments, the artificial depth of field may be applied in such a way that it maintains semantic coherence of the object of interest. For example the artificial depth of field should include the full person at a similar depth and not merely enhance the depth perception for a part of the person, e.g. part of the face. In some embodiments, where information is available, the artificial depth of field may be applied to maintain semantic of multiple objects in the scene, for example when another object/person is within a predefined threshold distance of the object of interest, a similar depth of field modification may be applied to the other object.

At block 416, the apparatus 100 may also include means, such as the processor 102, memory 104, communication interface 106, user interface 108, or the like, for providing the personalized feed of the omnidirectional content to the end user. For example, based on the object of interest and the artificial depth of field, a personalized feed may be presented to the end user centered on and framed around and/or following the object of interest, where the artificial depth of field emphasizes the object of interest.

In some embodiments, certain content capture characteristics of the end user device may be provided for use in generating the personalized content feed at blocks 414 and 416, such as for emulating the look of the video typically captured by the end user device. For example, in some embodiments, settings of the end user device such as hue, exposure, brightness, and or the like, may be provided and used to further personalize the content view. Such embodiments may allow the user to combine the personalized omnidirectional feed with video footage from her own device in an editing program and achieve a more consistent look in the final video.

As described above, FIG. 4 illustrates a flowchart of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the blocks with dashed outlines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
   generating, by a processor, a three-dimensional reconstruction of an omnidirectional content stream of an event from an omnidirectional capture device;
   determining a camera pose of an end user device in relation to the omnidirectional content stream;
   identifying an object of interest in the omnidirectional content stream based in part on the camera pose of the end user device;
   generating an artificial depth of field for the omnidirectional content stream using depth information from the three-dimensional reconstruction of the omnidirectional content stream such that the object of interest is in focus; and
   causing a personalized content view to be provided during or after the event based on the object of interest and the artificial depth of field.

2. The method of claim 1 further comprising determining framing around the object of interest to ensure the application of the artificial depth of field to one or more objects in the content is semantically coherent.

3. The method of claim 1 further comprising receiving sensor data or visual data from the end user device for use in determining the camera pose.

4. The method of claim 1 wherein generating the artificial depth of field comprises maintaining the focus of the object of interest and blurring other objects that are at a distance from the object of interest.

5. The method of claim 1 further comprising mapping reconstructed three-dimensional elements from the omnidirectional content stream to a camera view of the end user device based on the camera pose.

6. The method of claim 1 wherein identifying an object of interest comprises selecting a most central object in the camera view of the end user device or receiving an indication from a user of the end user device.

7. The method of claim 1 wherein the sensor data is one or more of magnetometer data, accelerometer data, or GPS data.

8. The method of claim 1 further comprising receiving end user device content capture characteristics for use in generating the personalized content view, wherein the content capture characteristics include one or more of hue settings, brightness settings, and exposure settings.

9. An apparatus comprising at least one processor and at least one memory including computer program instructions, the at least one memory and the computer program instructions, with the at least one processor, causing the apparatus at least to:
generate a three-dimensional reconstruction of an omnidirectional content stream of an event from an omnidirectional capture device;
determine a camera pose of an end user device in relation to the omnidirectional eap re content stream;
identify an object of interest in the omnidirectional content stream based in part on the camera pose of the end user device;
generate an artificial depth of field for the omnidirectional content stream using depth information from the three-dimensional reconstruction of the omnidirectional content stream such that the object of interest is in focus; and
cause a personalized content view to be provided during or after the event based on the object of interest and the artificial depth of field.

10. The apparatus of claim 9 further comprising the at least one memory and the computer program instructions, with the at least one processor, causing the apparatus at least to determine framing around the object of interest to ensure the application of the artificial depth of field to one or more objects in the content is semantically coherent.

11. The apparatus of claim 9 further comprising the at least one memory and the computer program instructions, with the at least one processor, causing the apparatus at least to receive sensor data or visual data from the end user device for use in determining the camera pose.

12. The apparatus of claim 9 wherein generating the artificial depth of field comprises maintaining the focus of the object of interest and blurring other objects that are at a distance from the object of interest.

13. The apparatus of claim 9 further comprising the at least one memory and the computer program instructions, with the at least one processor, causing the apparatus at least to map reconstructed three-dimensional elements from the omnidirectional content stream to a camera view of the end user device based on the camera pose.

14. The apparatus of claim 9 wherein identifying an object of interest comprises selecting a most central object in the camera view of the end user device or receiving an indication from a user of the end user device.

15. The apparatus of claim 9 wherein the sensor data is one or more of magnetometer data, accelerometer data, or GPS data.

16. The apparatus of claim 9 further comprising the at least one memory and the computer program instructions, with the at least one processor, causing the apparatus at least to receive end user device content capture characteristics for use in generating the personalized content view, wherein the content capture characteristics include one or more of hue settings, brightness settings, and exposure settings.

17. A computer program product comprising at least one non-transitory computer-readable storage medium bearing computer program instructions embodied therein for use with a computer, the computer program instructions comprising program instructions, when executed, causing the computer at least to:
generate a three-dimensional reconstruction of an omnidirectional content stream of an event from an omnidirectional capture device;
determine a camera pose of an end user device in relation to the omnidirectional content stream;
identify an object of interest in the omnidirectional content stream based in part on the camera pose of the end user device;
generate an artificial depth of field for the omnidirectional content stream using depth information from the three-dimensional reconstruction of the omnidirectional content stream such that the object of interest is in focus; and
cause a personalized content view to be provided during or after the event based on the object of interest and the artificial depth of field.

18. The computer program product of claim 17 further comprising program instructions, when executed, causing the computer at least to determine framing around the object of interest to ensure the application of the artificial depth of field to one or more objects in the content is semantically coherent.

19. The computer program product of claim 17 further comprising computer instructions, when executed, causing the computer at least to receive sensor data or visual data from the end user device for use in determining the camera pose.

20. The computer program product of claim 17 further comprising computer instructions, when executed, causing the computer at least to map reconstructed three-dimensional elements from the omnidirectional content stream to a camera view of the end user device based on the camera pose.

* * * * *

UNITED STATES PATENT AND TRADEMARK OFFICE
CERTIFICATE OF CORRECTION

PATENT NO.         : 10,291,845 B2
APPLICATION NO.    : 14/827736
DATED              : May 14, 2019
INVENTOR(S)        : Mate et al.

Page 1 of 1

It is certified that error appears in the above-identified patent and that said Letters Patent is hereby corrected as shown below:

In the Claims

Column 13
Line 38, delete "eap re"

Signed and Sealed this
Nineteenth Day of November, 2019

Andrei Iancu
*Director of the United States Patent and Trademark Office*